(12) United States Patent
McCluskey

(10) Patent No.: US 8,978,573 B2
(45) Date of Patent: Mar. 17, 2015

(54) BOAT TRAILER POSITION ASSISTING DEVICE

(76) Inventor: Steven R. McCluskey, Etobicoke (CA)

( * ) Notice: Subject to any disclaimer, the term of this patent is extended or adjusted under 35 U.S.C. 154(b) by 393 days.

(21) Appl. No.: 13/451,058

(22) Filed: Apr. 19, 2012

(65) Prior Publication Data
US 2013/0276692 A1 Oct. 24, 2013

(51) Int. Cl.
*B60P 3/10* (2006.01)
*B60Q 9/00* (2006.01)

(52) U.S. Cl.
CPC ..................... *B60P 3/1075* (2013.01)
USPC ............. 116/28 R; 116/52; 116/227

(58) Field of Classification Search
CPC ........ B60P 3/10; B60P 3/1033; B60P 3/1075; B60Q 1/2615; B60Q 1/30; B60Q 1/305; B60Q 1/50; B60Q 7/00; B60Q 7/005; B60Q 7/02; B60Q 9/00; B60R 9/00; B60R 9/06; B63C 3/00
USPC ............. 116/28 R, 30, 51, 52, 227, 228, 229; 33/264; 248/206.5, 214
See application file for complete search history.

(56) References Cited

U.S. PATENT DOCUMENTS

| | | | |
|---|---|---|---|
| 3,752,431 A * | 8/1973 | McBride | 248/291.1 |
| 3,821,699 A | 6/1974 | Marus et al. | |
| 3,989,213 A * | 11/1976 | Allen | 248/214 |
| 3,995,251 A | 11/1976 | Jones | |
| 4,091,442 A * | 5/1978 | Markey | 362/485 |
| D261,998 S | 11/1981 | Munz | |
| 4,940,251 A | 7/1990 | Willmsen | |
| 5,094,001 A * | 3/1992 | Fraser | 33/264 |
| 5,097,250 A | 3/1992 | Hernandez | |
| 5,113,588 A * | 5/1992 | Walston | 33/264 |
| 5,396,857 A | 3/1995 | Emery, Jr. | |
| 5,515,025 A | 5/1996 | Barrows | |
| 5,596,944 A * | 1/1997 | Massie | 116/28 R |
| 5,850,175 A | 12/1998 | Yeilding | |
| 6,199,503 B1 * | 3/2001 | Midgett | 116/28 R |
| 6,374,766 B1 * | 4/2002 | Clark | 116/28 R |
| 7,063,039 B2 * | 6/2006 | Emerson et al. | 116/28 R |
| 7,128,019 B2 * | 10/2006 | Hensel | 116/35 R |
| 7,523,952 B1 * | 4/2009 | Spears, Jr. | 280/414.1 |
| 7,637,226 B1 * | 12/2009 | Bradley | 116/28 R |
| 2003/0137124 A1 * | 7/2003 | Marchese | 280/414.1 |

\* cited by examiner

*Primary Examiner* — R. A. Smith

(57) ABSTRACT

A boat trailer position assisting device includes a plate has a front side and a back side. A post is attached to and extends outwardly from the front side. A bulbous member is attached to a distal end of the post relative to the plate. An attachment member is attached to the plate and removably attaches the plate to a trailer. The trailer may then be backed into a body of water until the bulbous member touches the water to indicate that trailer is deep enough in the water.

12 Claims, 5 Drawing Sheets

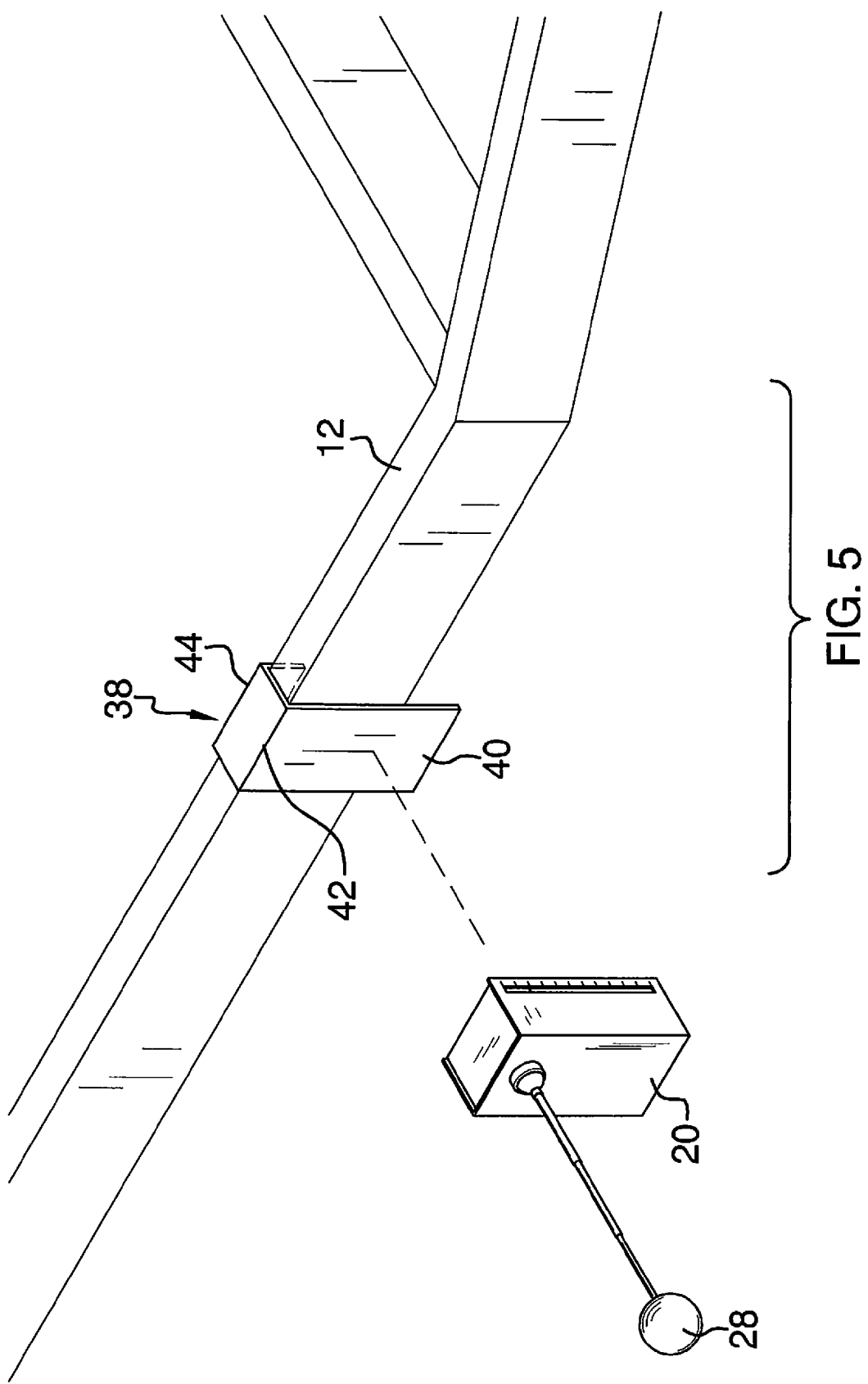

BOAT TRAILER POSITION ASSISTING DEVICE

BACKGROUND OF THE DISCLOSURE

Field of the Disclosure

The disclosure relates to trailer water depth indicating devices and more particularly pertains to a new trailer water depth indicating device for assisting a person in determining when a boat trailer has been placed far enough into a body of water to load or unload a boat from the trailer.

SUMMARY OF THE DISCLOSURE

An embodiment of the disclosure meets the needs presented above by generally comprising a plate has a front side and a back side. A post is attached to and extends outwardly from the front side. A bulbous member is attached to a distal end of the post relative to the plate. An attachment member is attached to the plate and is configured to engage a boat trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a perspective view of an embodiment of the disclosure.

DESCRIPTION OF THE PREFERRED EMBODIMENT

Figure 1:
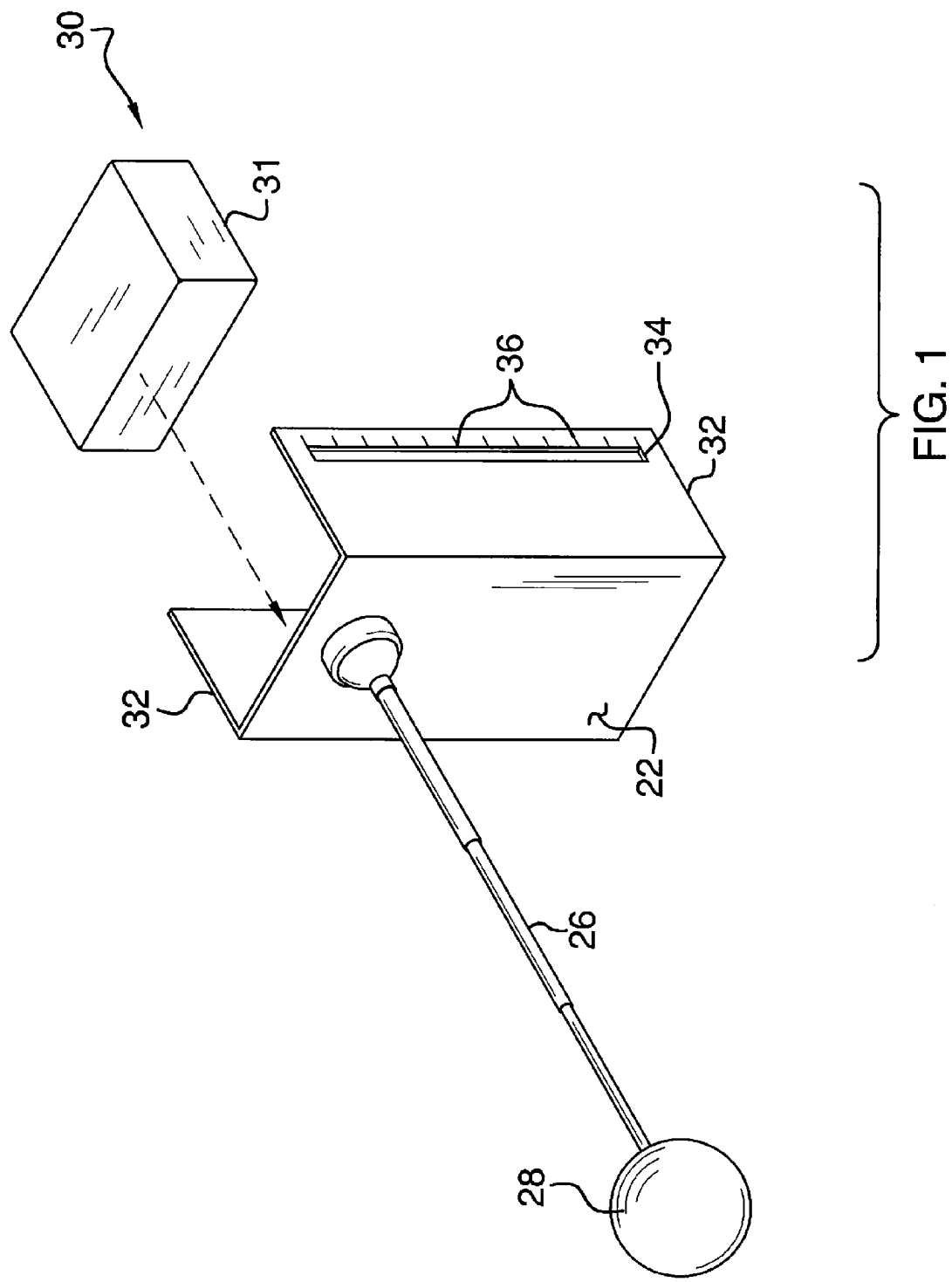
FIG. 1 is a front perspective view of a boat trailer position assisting device according to an embodiment of the disclosure.
Figure 2:
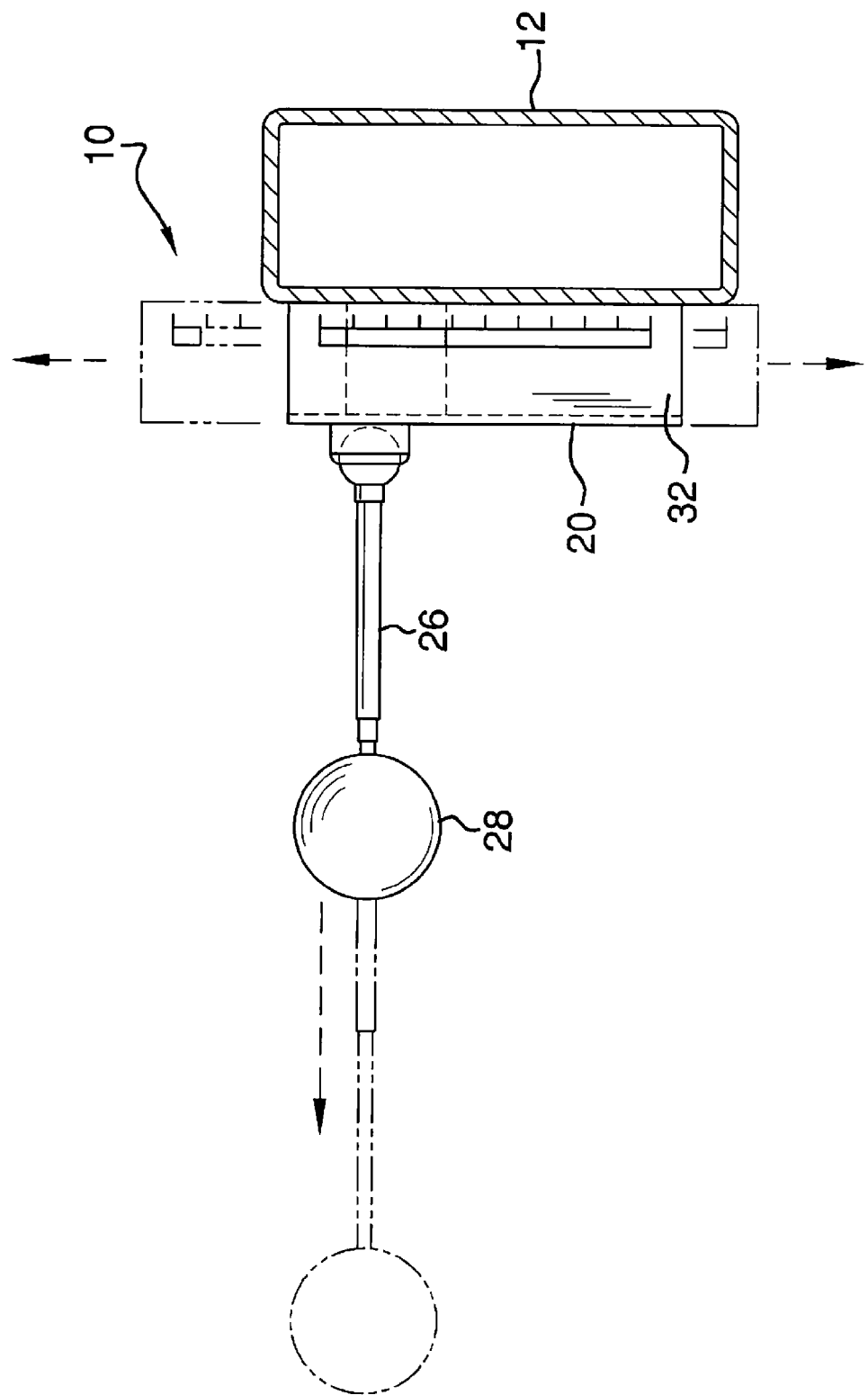
FIG. 2 is a side view of an embodiment of the disclosure.
Figure 3:
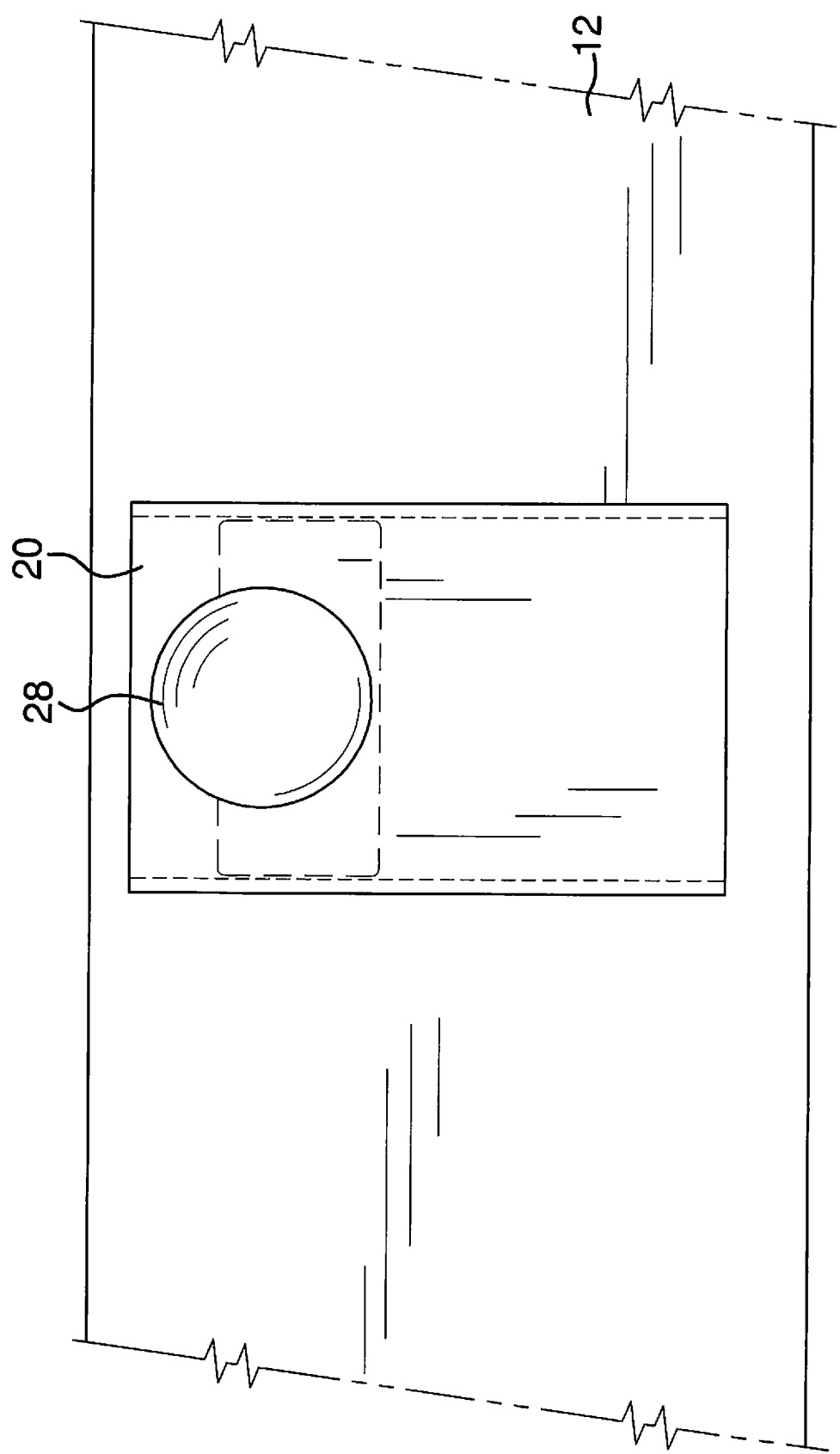
FIG. 3 is a front view of an embodiment of the disclosure.
Figure 4:
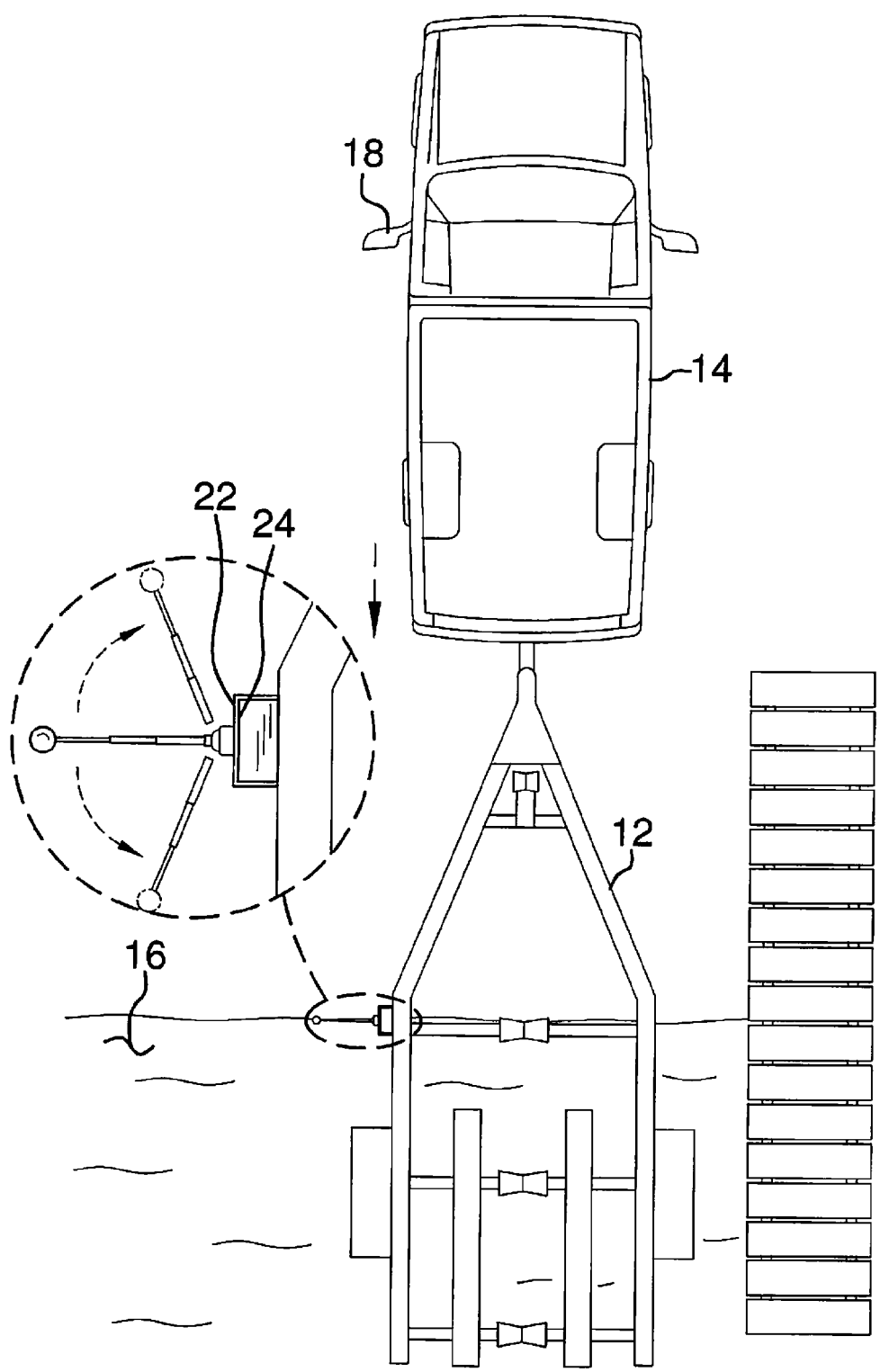
FIG. 4 is a top view of an embodiment of the disclosure.

With reference now to the drawings, and in particular to FIGS. 1 through 5 thereof, a new trailer water depth indicating device embodying the principles and concepts of an embodiment of the disclosure and generally designated by the reference numeral 10 will be described.

As best illustrated in FIGS. 1 through 5, the boat trailer position assisting device 10 generally comprises a conventional boat trailer 12. The trailer 12 is coupled to a vehicle 14 and is backed into a body of water 16 for placing a boat, not shown, into the water 16 or removing the boat from the water 16.

A plate 20 is provided which has a front side 22 and a back 24 side. A post 26 is attached to and extends outwardly from the front side 22. The post 26 may be pivotable with respect to plate 20. This allows a person to alter the position of the post 26 relative to the plate 20 and more particularly with respect to the trailer 12 when the plate 20 is mounted on the trailer 12 as is further provided for below. The post 26 may be telescopic and has an adjustable length. This may be used to extend the post 26 a selected distance from the plate 20 or retract it for storage purposes. A bulbous member 28 is attached to a distal end of the post 26 relative to the plate 20. The bulbous member 28 may be colored and in particular may have a bright and/or highly reflective surface coloring or coating.

An attachment member 30 is attached to the plate 20. The attachment member 30 is removably engaged to the boat trailer 12. The attachment member 30 may comprise a magnet 31. A pair of lateral walls 32 is attached to and extends rearwardly from the plate 20. One of the lateral walls 32 has a vertical slot 34 extending therethrough. Height indicia 36 are positioned adjacent to the slot 34 to indicate a relative position of the plate 20 on the trailer 12 when the plate 20 is mounted on the trailer 12. The slot 34 also allows a person to determine where the magnet 31, or attachment member 30, is placed relative to the plate 20. The height indicia 36 need not be actual measurements but equally spaced markings to allow a person to easily remember a position of the plate 22 and magnet 31 on the trailer 12.

A bracket 38 may be provided which includes a front panel 40 that has an upper edge 42. A hook 44 is attached to the upper edge 42 and is removably positioned over the trailer 12. The front panel 40 comprises a magnet 31 attracting material such as a ferromagnetic material. The magnet 31 is releasably coupled to the bracket 38 when the bracket 38 is positioned on the trailer 12. The bracket 38 is used when trailer 12 is comprised of a non-magnetically attractive, or paramagnetic, material such as aluminum.

In use, the plate 20 is mounted on the trailer 12 and backed into the body of water 16. The first time this is accomplished, the user will determine the proper positioning of the plate 20 relative to the trailer 12 such that the bulbous member 28 is just touching the surface of the water 16. The user will then remember the position of the plate 20 relative to the trailer 12. When the trailer 12 is used in the future, the user will mount the plate 20 on the trailer 12 where needed and back the trailer 12 into the water 16. The user will be able to see the bulbous member 28 in the rear view mirror 18 of the vehicle 14 when it strikes the water 16. The trailer 12 will then be properly positioned in the water 16 to either load or remove the boat from the trailer 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trailer positioning assist apparatus configured for being mounted on a trailer to indicate when the trailer is positioned at a proper depth in water, said apparatus comprising:

a plate having a front side and a back side;

a post being attached to and extending outwardly from said front side;

a bulbous member being attached to a distal end of said post relative to said plate;

an attachment member being attached to said plate, said attachment member being configured to engage a boat trailer, said attachment member comprises a magnet; and a bracket including a front panel having an upper edge, a hook being attached to said upper edge, said hook being configured to be positioned over said trailer, said front panel comprising a magnet attracting material, said magnet being releasably coupled to said bracket when said bracket is positioned on the trailer.

2. The trailer positioning assist apparatus as in claim 1, wherein said post is pivotable with respect to plate.

3. The trailer positioning assist apparatus as in claim 2, wherein said post is telescopic and has an adjustable length.

4. The trailer positioning assist apparatus as in claim 1, wherein said post is telescopic and has an adjustable length.

5. The trailer positioning assist apparatus as in claim 1, further including a pair of lateral walls being attached to and extending rearwardly from said plate, one of said lateral walls having a vertical slot extending therethrough, height indicia being positioned adjacent to said slot to indicate a relative position of said plate on said trailer when said plate is mounted on said trailer.

6. A trailer positioning assist system comprising:

a trailer configured for supporting a boat:

a plate having a front side and a back side;

a post being attached to and extending outwardly from said front side;

a bulbous member being attached to a distal end of said post relative to said plate;

an attachment member being attached to said plate, said attachment member releasably attaching said plate to said trailer, said post extending laterally away from said trailer; and a pair of lateral walls being attached to and extending rearwardly from said plate, one of said lateral walls having a vertical slot extending therethrough, height indicia being positioned adjacent to said slot to indicate a relative position of said plate on said trailer.

7. The trailer positioning assist apparatus as in claim 6, wherein said post is pivotable with respect to plate.

8. The trailer positioning assist apparatus as in claim 7, wherein said post is telescopic and has an adjustable length.

9. The trailer positioning assist apparatus as in claim 6, wherein said post is telescopic and has an adjustable length.

10. The trailer positioning assist apparatus as in claim 6, wherein said attachment member comprises a magnet.

11. The trailer positioning assist apparatus as in claim 10, further including a bracket including a front panel having an upper edge, a hook being attached to said upper edge, said hook being removably positioned on said trailer, said front panel comprising a magnet attracting material, said magnet being releasably coupled to said bracket.

12. A trailer positioning assist apparatus configured for being mounted on a trailer to indicate when the trailer is positioned at a proper depth in water, said apparatus comprising:

a plate having a front side and a back side;

a post being attached to and extending outwardly from said front side, said post being pivotable with respect to plate, said post being telescopic and having an adjustable length;

a bulbous member being attached to a distal end of said post relative to said plate;

an attachment member being attached to said plate, said attachment member being configured to engage a boat trailer, said attachment member comprising a magnet;

a pair of lateral walls being attached to and extending rearwardly from said plate, one of said lateral walls having a vertical slot extending therethrough, height indicia being positioned adjacent to said slot to indicate a relative position of said plate on said trailer when said plate is mounted on said trailer; and a bracket including a front panel having an upper edge, a hook being attached to said upper edge, said hook being configured to be positioned over said trailer, said front panel comprising a magnet attracting material, said magnet being releasably coupled to said bracket when said bracket is positioned on the trailer.

* * * * *